United States Patent
Wang

(10) Patent No.: US 9,354,978 B2
(45) Date of Patent: May 31, 2016

(54) SYSTEM AND METHOD FOR RECOVERING FROM A CONFIGURATION ERROR

(71) Applicant: Bi-Chong Wang, Austin, TX (US)

(72) Inventor: Bi-Chong Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 14/311,081

(22) Filed: Jun. 20, 2014

(65) Prior Publication Data

US 2014/0304546 A1    Oct. 9, 2014

Related U.S. Application Data

(63) Continuation of application No. 12/970,557, filed on Dec. 16, 2010, now Pat. No. 8,788,883.

(51) Int. Cl.
*G06F 11/00*    (2006.01)
*G06F 11/14*    (2006.01)

(52) U.S. Cl.
CPC .......... *G06F 11/142* (2013.01); *G06F 11/1417* (2013.01); *G06F 11/1425* (2013.01)

(58) Field of Classification Search
CPC .............. G06F 11/142; G06F 11/1417; G06F 11/1425; G06F 11/07; G06F 11/073; G06F 11/20; G06F 11/2017

USPC ................. 714/36, 6.1, 6.11, 6.13, 25, 42, 57
See application file for complete search history.

(56) References Cited

U.S. PATENT DOCUMENTS

| | | | |
|---|---|---|---|
| 6,694,468 B1 | 2/2004 | Sun | 714/735 |
| 7,246,269 B1 | 7/2007 | Hamilton | 714/42 |
| 2003/0140271 A1 | 7/2003 | Wynn et al. | 714/8 |
| 2004/0003321 A1* | 1/2004 | Glew | G06F 21/74 714/27 |
| 2004/0143719 A1 | 7/2004 | Nguyen et al. | 711/202 |
| 2004/0181656 A1 | 9/2004 | Stern et al. | 713/1 |
| 2004/0243884 A1 | 12/2004 | Vu et al. | 714/42 |
| 2005/0102568 A1 | 5/2005 | Billick et al. | 714/25 |
| 2006/0075276 A1 | 4/2006 | Kataria et al. | 714/4 |
| 2007/0214333 A1 | 9/2007 | Nijhawan et al. | 711/165 |
| 2009/0049335 A1 | 2/2009 | Khatri et al. | 714/7 |
| 2009/0254732 A1* | 10/2009 | Dang | G06F 11/006 711/172 |
| 2010/0293410 A1 | 11/2010 | Bland et al. | 714/42 |

\* cited by examiner

*Primary Examiner* — Joseph D Manoskey
(74) *Attorney, Agent, or Firm* — Baker Botts L.L.P.

(57) ABSTRACT

A system and method for recovering from a configuration error are disclosed. A Basic Input Output System (BIOS) configures a memory associated with a node of an information handling system and enables a progress monitoring process during configuration of the memory. The memory is disabled if the BIOS determines that a configuration error occurred and a memory reference code associated with the memory is modified in order to prevent a reset of the information handling system.

20 Claims, 2 Drawing Sheets

SYSTEM AND METHOD FOR RECOVERING FROM A CONFIGURATION ERROR

CROSS-REFERENCE TO RELATED APPLICATION

The present application is a continuation application of copending U.S. patent application Ser. No. 12/970,557 filed Dec. 16, 2010, which is hereby incorporated by reference in its entirety for all purposes.

TECHNICAL FIELD

The present disclosure relates in general to information handling systems, and more particularly to systems and methods for recovering from a configuration error.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use one or more processors and one or more associated memories to process and store information. Physical and logical relationships among processors and their associated memory may be established according to any number of architectures. For example, processors and memories may be logically organized based on a non-uniform memory access (NUMA) architecture. In a NUMA architecture, each processor in an information handling system may have its own separate, dedicated memory. The NUMA architecture may be advantageous for a number of reasons. First, a processor can often access memory physically proximate to the processor (e.g., local memory) faster than non-local memory (e.g., memory local to another processor or memory shared between processors). Second, a NUMA-aware operating system may optimize overall memory bandwidth and allocated local memory to a processor by providing a dedicated memory for each processor.

During startup of an information handling system, the components of the system may initialized by a basic input/output system (BIOS). The initialization process may determine certain attributes, including the type, speed, time factoring and size of the memory in the information handling system. The initialization process may also test and/or train the memory to ensure that they are functioning properly. However, when a memory failure is detected, the information handling system may reset without properly identifying the problem. In this case, the information handling system may be re-initialized, the memory failure of may be detected again, and the information handling system may be reset again, creating an infinite loop.

SUMMARY

In accordance with the present disclosure, the disadvantages and problems associated with recovering from a configuration error have been substantially reduced or eliminated. In a particular embodiment, a method for recovering from a configuration error in an information handling system includes configuring a memory associated with a node of an information handling system and enabling a progress monitoring process by a Basic Input Output System (BIOS) during configuration of the memory. The memory is disabled if the BIOS determines that a configuration error occurred. A memory reference code associated with the memory may be modified in order to prevent a reset of the information handling system.

In accordance with another embodiment of the present disclosure, an information handling system configured to recover from a configuration error includes a node having a processor and a memory communicatively coupled to the processor. The node may be communicatively coupled to a chipset including a Basic Input Output System (BIOS). The BIOS may be operable to configure the memory and enable a progress monitoring process during configuration of the memory. The BIOS may further be operable to disable the memory if a configuration error occurs and modify a memory reference code associated with the memory in order to prevent a reset of the information handling system.

In accordance with a further embodiment of the present disclosure, a method for recovering from a configuration error in an information handling system includes configuring a plurality of nodes in an information handling system, where each of the plurality of nodes includes at least one dual in-line memory modules (DIMM). A Basic Input Output System (BIOS) enables a progress monitoring process during configuration of the nodes. A node of the plurality of nodes is disabled if the BIOS determines that the configuration error occurred in the at least one DIMM associated with the node. The memory reference code associated with the at least one DIMM including the configuration error is modified in order to prevent a reset of the information handling system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
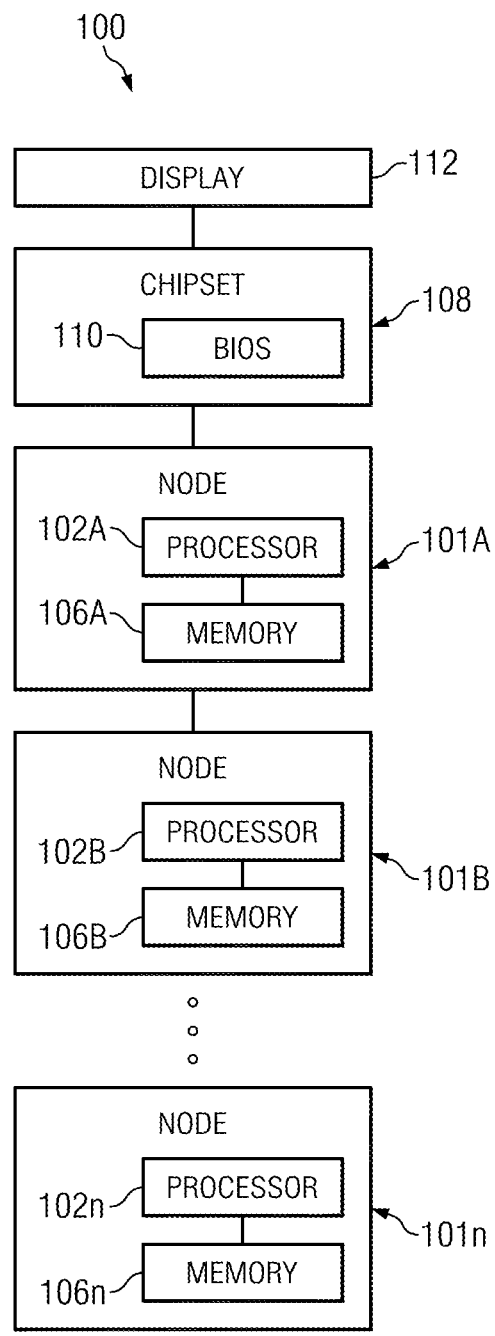
FIG. 1 illustrates an example embodiment of an information handling system in accordance with the teachings of the present disclosure.
Figure 2:
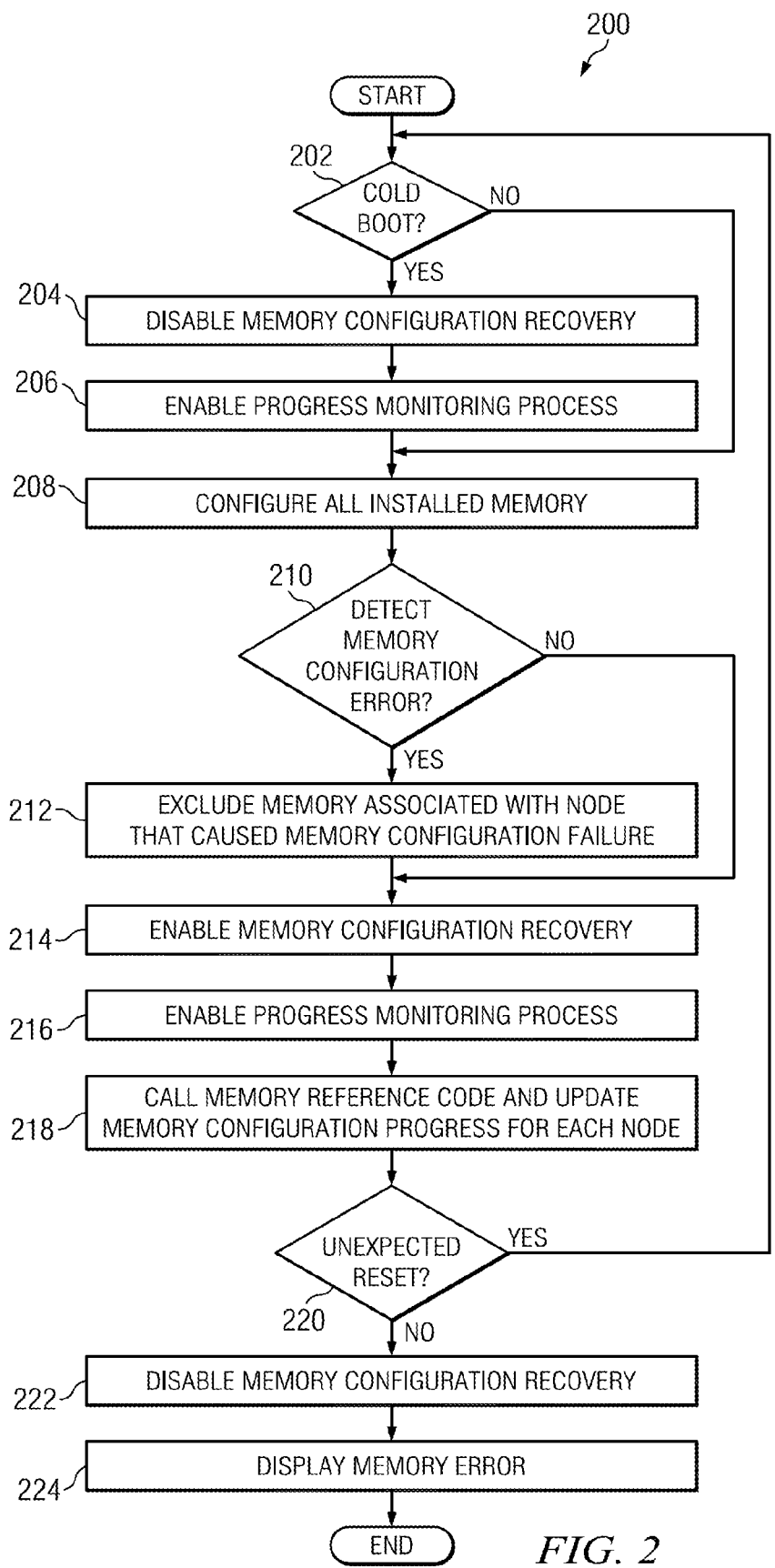
FIG. 2 illustrates a flow chart of an example method for recovering from a configuration error in accordance with the teachings of the present disclosure.

Embodiments of the present disclosure and their advantages are best understood by reference to FIGS. 1 and 2, where like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory.

FIG. 1 illustrates an example information handling system 100 in accordance with the teachings of the present disclosure. Information handling system 100 may include one or more nodes 101 configured to interpret and/or execute program instructions. In some embodiments, information handling system 100 may be configured as a non-uniform memory access (NUMA) system where each of nodes 101 may be communicatively coupled to at least one other node 101 via one or more bidirectional high-bandwidth buses.

In some embodiments, each of nodes 101 may include processor 102 and/or memory 106. Processor 102 may include any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 106 and/or another component of information handling system 100, and may output results, graphical user interfaces (GUIs), websites, and the like via a display device (e.g., display 112) or over a network interface (not expressly shown). Although FIG. 1 illustrates one processor per node, other embodiments may allow for more than one processor per node.

Memory 106 may be communicatively coupled to processor 102 and may include any system, device, or apparatus configured to retain program instructions and/or data for a period of time (e.g., computer-readable media). Memory 106 may be programmable read-only memory (PROM), erasable programmable read-only memory (EPROM), electronically erasable programmable memory, a PCMCIA card, flash memory, magnetic storage, opto-magnetic storage, or any suitable selection and/or array of volatile or non-volatile memory that retains data after power to information handling system 100 is turned off. Memory 106 may also be any one of random access memory (RAM), dynamic random access memory (DRAM), extended data out random access memory (EDO RAM), video random access memory (VRAM), static random access memory (SRAM), synchronous DRAM (SDRAM), single in-line memory modules (SIMM), dual in-line memory modules (DIMM), and/or any other suitable data storage medium. Memory 106 may be a single component or formed by separate components. It is noted that while FIG. 1 depicts each node 101 as having one memory 106, any suitable number of memory devices may be used.

Information handling system 100 may further include chipset 108 communicatively coupled to one or more of nodes 101. In one embodiment, chipset 108 may be directly coupled to one node (e.g., node 101A) and indirectly connected to other nodes (e.g., nodes 101B through 101n) in information handling system 100. In another embodiment, chipset 108 may be directly coupled to all nodes 101 in information handling system 100. Information handling system 100 may further include display 112. Display 112 may be communicatively coupled to chipset 108 or one or more of nodes 101. Display 106 may be any display device suitable for creating graphic images and/or alphanumeric characters recognizable to a user, and may include, for example, a liquid crystal display (LCD) or a cathode ray tube (CRT).

Chipset 108 may include Basic Input/Output System (BIOS) 110. When information handling system 100 is initialized, BIOS 110 may execute a Power On Self Test (POST) routine, as is well known to those of skill in the art. After completion of the POST routine, BIOS 110 preferably hands off to an operating system. During the POST routine, BIOS 110 may perform data and address testing and training of memory 106, as discussed below.

In operation, during the initialization of information handling system 100, BIOS 110 may be configured to execute diagnostics and other routines that prepare information handling system 100, and in particular, nodes 101 for use. In some embodiments, BIOS 110 may determine attributes including, but not limited to, type, speed, time factoring and size associated with memory 106. BIOS 110 may also test and/or train memory 106, and may map which of memory 106 of information handling system 100 will be available to the operating system once initialization is complete. The system memory map may be created by BIOS 110 and communicated to the operating system through a memory mapping call such as, for example, INT15-E820.

In one embodiment, BIOS 110 may disable the memory configuration recovery process for information handling system 100 during initialization of the system and may enable a progress monitoring process to monitor the progress of the configuration of memory 106 in node 101. The progress monitoring process may determine whether a configuration error occurred in one or more of memory 106 and disable the failed memory or the entire node associated with the failed memory so that information handling system 100 in order to avoid a reset of information handling system 100 when an error is detected.

In one embodiment, information handling system 100 may initialize each of nodes 101 sequentially such that, for example, node 101A is initialized first and node 101N is initialized last. In this embodiment, BIOS 110 may write a pattern of data to a particular address of memory 106A. In some embodiments, memory 106A may include multiple DIMMs and BIOS 110 may write to a memory address for each of the DIMMs. In one embodiment, the data pattern may be simultaneously written to each of the multiple DIMMs. In another embodiment, the data pattern may be sequentially written to each of the multiple DIMMs until the data has been written to each one of the multiple DIMMs.

Once written to memory 106A, the data pattern may be subsequently read back by BIOS 110. If the data pattern read back from each of the multiple DIMMs are the same as the data pattern that was written the multiple DIMMs, BIOS 110 may determine that memory 106A passed the test and is functioning correctly. However, if the data pattern read back does not match the data pattern that was written or if BIOS 110 cannot write to one or more of the DIMMs, memory 106A may be deemed to have failed the test due to an error. An error may occur when one or more of the DIMMs is not detected (e.g., the DIMM is not seated properly such that it may affect the electrical loading of a memory channel), when an address parity error is detected, and/or when the use and/or functionality of memory 106A is affected.

If all of the multiple DIMMs of memory 106A are functioning correctly, BIOS 110 may update a system memory map. The system memory map may include information that indicates, for example, information regarding the size of each individual DIMM of memory 106A, any reserved regions within each of the individual DIMMs, and/or other details specific to the architecture of the multiple DIMMs including, for example, specific DIMMs of memory 106A that are functional and available to the operating system.

If any of the DIMMs of memory 106A have an error, BIOS 110 may indicate the error by setting a check bit in a register associated with memory 106A. In some embodiments, the check bit may be a disable bit or an exclude bit, such that memory 106A is rendered unavailable to the operating system. BIOS 110 may also update the system memory map to indicate that memory 106A is unavailable and may exclude memory 106A.

BIOS 110 may additionally modify a memory reference code associated with memory 106A. In one embodiment, BIOS 110 may change the status of memory 106A. For example, BIOS 110 may override the status of memory 106A in the memory reference code to avoid a failure report, thus allowing BIOS 110 to complete the initiation process of node 101A and to complete the initiation process for the remaining nodes (e.g., node 101B to 101n) of information handling system 100.

In the described embodiment, BIOS 110 may disable memory 106 if at least one of the DIMMs has an error such that the corresponding one of nodes 101 is also disabled. In other embodiments, BIOS 110 may partially disable memory 106 based on the channel associated with the DIMM that has an error. For example, memory 106A may include four DIMMs that may be coupled to processor 102A by two channels. If BIOS 110 determines that one of the DIMMs associated with a first channel has an error but both of the DIMMs associated with a second channel are functioning correctly, BIOS 110 may disable the DIMMs associated with the first channel but may indicate that the DIMMs associated with the second channel are available to the operating system. Thus, BIOS 110 may partially enable node 101A with respect to the portions of memory 106A associated with the second channel.

Once BIOS 110 has initialized all nodes 101, any errors associated with memory 106 in nodes 101 may be displayed to a user on display 112 so that the errors can be diagnosed and corrected. If the errors can be corrected, information handling system 100 may be re-initialized such that the previously disabled memory 106 can be enabled and made available to the operating system.

FIG. 2 illustrates a method 200 for recovering from a memory configuration error in accordance with the teachings of the present disclosure. At step 202, BIOS 110 determines if the reset of information handling system 100 is a cold or hard reset. If the reset is not a cold or hard reset (e.g., information handling system 100 is reset by a warm or soft reset), the method proceeds to step 208 without disabling the memory recovery process. If the reset is a cold or hard reset, BIOS 110 disables the memory configuration recovery process for information handling system 100 at step 204 and enables a progress monitoring process for monitoring the configuration of memory 106 in nodes 101 at step 206. In one embodiment, BIOS 110 may enable the progress monitoring process by initializing a memory configuration progress flag.

After enabling the progress monitoring process, BIOS 110 initializes information handling system 100 by configuring memory 106 in nodes 101 at step 208. In one embodiment, one or more of memory 106 may include multiple DIMMs. BIOS 110 may determine attributes such as, for example, type, speed, time factoring and size associated with each of the multiple DIMMs of memory 106. During configuration, BIOS 110 may also test and/or train each of the multiple DIMMs of memory 106. In some embodiments, BIOS 110 may write a pattern of data to a particular memory address of one or more of the multiple DIMMs of memory 106. In one embodiment, the data pattern may be simultaneously written to each of the multiple DIMMs. In another embodiment, the data pattern may be sequentially written to each of the multiple DIMMs until the data has been written to each one of the multiple DIMMs.

At step 210, BIOS 110 may determine if a memory configuration error occurred in one or more of memory 106 by using the progress monitoring process to monitor configuration of memory 106 in nodes 101. In some embodiments, BIOS 110 may interface with the memory reference code using the progress monitoring process to monitor the memory training or configuration process for each node 101 in order to determine if a memory configuration error occurred.

During configuration, BIOS 110 may read the data pattern from the particular memory address of memory 106 to determine if the multiple DIMMs are functioning properly. In one embodiment, BIOS 110 may simultaneously read the data pattern from each of the multiple DIMMs. In another embodiment, BIOS 110 may sequentially read the data pattern from each of the multiple DIMMs until the data pattern has been read from each one of the multiple DIMMs. If the data pattern read by BIOS 110 for each of the multiple DIMMs matches the data pattern that was written, indicating that no memory configuration error occurred during configuration, method 200 may proceed to step 214.

If BIOS 110 determines that there is a memory configuration error in one or more of memory 106 (e.g., the data pattern read by BIOS 110 does not match the written data pattern), BIOS 110 may disable the failed memory through the progress monitoring process at step 212. In one embodiment, BIOS 110 may disable the failed memory by setting a check bit, such as a disable bit or an exclude bit, in a register associated with the failed memory. In one embodiment, BIOS 110 may disable an entire node if at least one of the DIMMs of the associated memory has a memory configuration error. In other embodiments, BIOS 110 may partially disable the failed memory based on the memory channel associated with the failed DIMM. In this embodiment, the node will be partially enabled such that the operating system can access the portions of memory 106 through the channel associated with the DIMMs that BIOS 110 determined were functioning correctly. BIOS 110 may additionally report any errors in memory 106 by updating a system memory map to indicate that memory 106 has failed.

At step 214, BIOS 110 may enable the memory configuration recovery process if it was previously disabled. At step 216, BIOS 110 may again enable a progress monitoring process for monitoring the configuration of memory 106 in nodes 101. Method 200 may then proceed to step 218 where BIOS 110 may call a memory reference code associated with information handling system 100 and update the memory configuration progress flag as each node 101 is configured. In one embodiment, BIOS 110 may override the failed status of memory 106 in the memory reference code, such that the initiation process of information handling system 100, and in particular, the configuration of memory 106 may continue. By overriding the status of the failed memory, BIOS 110 may prevent information handling system 100 from being reset and entering into an infinite loop due to the failed memory.

At step 220, BIOS 110 may determine if an unexpected reset occurs. In one embodiment, an unexpected reset could be caused by memory configuration errors encountered during various stages of memory training (e.g., DDR phy fence training, DRAM channel frequency change, DRAM training, etc.). In other embodiments, an unexpected reset may be caused by factors including, but not limited to, a DIMM not being fully inserted, an invalid memory configuration, a faulty DIMM, and an address parity error. If an unexpected reset occurs, method 200 may return to step 202 to start the initialization process over.

If an unexpected reset does not occur, BIOS 110 may disable the memory configuration recovery process for information handling system 100 at step 222. Additionally, the errors may be displayed to a user at display 112 at step 224 so that the configuration errors can be diagnosed and corrected.

Method 200 may be repeated for each node 101 of information handling system. In some embodiments, method 200 may be performed in parallel for each of nodes 101. In other embodiments, method 200 may be performed serially, e.g., first in node 101A, next in node 101B, etc.

Method 200 may be implemented using the system of FIG. 1, or any other system operable to implement method 200. As such, the preferred initialization point for method 200 and the order of the steps in method 200 may depend on the implementation chosen. In some embodiments, some steps may be optionally omitted, repeated, or combined. In some embodiments, portions of method 200 may be combined. In certain embodiments, method 200 may be implemented partially or fully in software embodied in computer-readable media.

The system and method of the present disclosure provides for monitoring the progress of a memory reference code during an initialization process in order to avoid a reset of information handling system 100 when an error is detected. Whenever the code execution is out of an expected sequence, the BIOS disables the memory of the failed node. By disabling the failed memory, the BIOS limits the number of retries to enable the memory and thus, prevents the system from resetting due to the failed memory and going into an infinite loop.

The system and method of the present disclosure also provides an error log in a system memory map, allowing for the error to be pinpointed and subsequently corrected. If any errors are detected, the errors may be reported to a user. The reported errors can be diagnosed and corrected (e.g., replacing one or more DIMMs of memory 106) such that the system can be re-initialized in order to enable the previously disabled memory.

Although the present disclosure has been described in detail, it should be understood that various changes, substitutions, and alterations can be made hereto without departing from the spirit and the scope of the disclosure as defined by the appended claims.

What is claimed is:

1. A method for recovering from errors in an information handling system, comprising:
   enabling a progress monitoring process by a Basic Input Output System (BIOS);
   determining, from the progress monitoring process, whether a first memory configuration error has occurred on the information handling system;
   configuring a memory included in a node of a plurality of nodes of an information handling system, based on the determination of whether a first memory configuration error has occurred, wherein each of the nodes includes a processor;
   disabling the memory based on a determination by the BIOS that a second memory configuration error has occurred with respect to the memory; and
   modifying a memory reference code associated with the memory in order to prevent the information handling system from entering an infinite loop based on a reset of the information handling system in response to the second memory configuration error.

2. The method of claim 1, further comprising:
   determining whether a soft reboot occurred as a result of the first memory configuration error; and
   configuring the memory further based on the determination of whether the soft reboot occurred as a result of the first memory configuration error.

3. The method of claim 1, further comprising:
   writing a first data pattern to the memory;
   reading a second data pattern from the memory; and
   determining whether the second data pattern matches the first data pattern.

4. The method of claim 3, further comprising determining that the second memory configuration error occurred based on the determination of whether the second data pattern matches the first data pattern.

5. The method of claim 1, further comprising setting a bit in a register associated with the memory in order to disable the memory.

6. The method of claim 1, further comprising disabling the memory by excluding the memory from use by an operating system executing on the information handling system.

7. The method of claim 1, further comprising:
   enabling a memory configuration recovery process after the memory is disabled; and
   overriding a failed status of the memory subsequent to disabling the memory.

8. An information handling system, comprising:
   a processor; and
   computer-readable media comprising instructions readable by the processor;
   wherein the processor is to, when executing the instructions loaded from the computer-readable media:
      enable a progress monitoring process by a Basic Input Output System (BIOS);
      determine, from the progress monitoring process, whether a first memory configuration error has occurred on the information handling system;
      configure a memory included in a node of a plurality of nodes of an information handling system, based on the determination of whether a first memory configuration error has occurred, wherein each of the nodes includes a node processor;

disable the memory based on a determination by the BIOS that a second memory configuration error has occurred with respect to the memory; and modify a memory reference code associated with the memory in order to prevent the information handling system from entering an infinite loop based on a reset of the information handling system in response to the second memory configuration error.

9. The information handling system of claim 8, wherein the processor is further to:

determine whether a soft reboot occurred as a result of the first memory configuration error; and configure the memory further based on the determination of whether the soft reboot occurred as a result of the first memory configuration error.

10. The information handling system of claim 8, wherein the processor is further to:

write a first data pattern to the memory;

read a second data pattern from the memory; and determine whether the second data pattern matches the first data pattern.

11. The information handling system of claim 10, wherein the processor is further to determine that the second memory configuration error occurred based on the determination of whether the second data pattern matches the first data pattern.

12. The information handling system of claim 8, wherein the processor is further to set a bit in a register associated with the memory in order to disable the memory.

13. The information handling system of claim 8, wherein the processor is further to disable the memory by excluding the memory from use by an operating system executing on the information handling system.

14. The information handling system of claim 8, wherein the processor is further to:

enable a memory configuration recovery process after the memory is disabled; and override a failed status of the memory subsequent to disabling the memory.

15. A non-transitory computer-readable media comprising instructions readable by a processor, the instructions, when loaded and executed on the processor, to cause the processor to:

enable a progress monitoring process by a Basic Input Output System (BIOS);

determine, from the progress monitoring process, whether a first memory configuration error has occurred on the information handling system;

configure a memory included in a node of a plurality of nodes of an information handling system, based on the determination of whether a first memory configuration error has occurred, wherein each of the nodes includes a node processor;

disable the memory based on a determination by the BIOS that a second memory configuration error has occurred with respect to the memory; and modify a memory reference code associated with the memory in order to prevent the information handling system from entering an infinite loop based on a reset of the information handling system in response to the second memory configuration error.

16. The non-transitory computer-readable memory media of claim 15, further comprising instructions for causing the processor to:

determine whether a soft reboot occurred as a result of the first memory configuration error; and configure the memory further based on the determination of whether the soft reboot occurred as a result of the first memory configuration error.

17. The non-transitory computer-readable memory media of claim 15, further comprising instructions for causing the processor to:

write a first data pattern to the memory;

read a second data pattern from the memory; and determine whether the second data pattern matches the first data pattern.

18. The non-transitory computer-readable memory media of claim 17, further comprising instructions for causing the processor to determine that the second memory configuration error occurred based on the determination of whether the second data pattern matches the first data pattern.

19. The non-transitory computer-readable memory media of claim 15, further comprising instructions for causing the processor to set a bit in a register associated with the memory in order to disable the memory.

20. The non-transitory computer-readable memory media of claim 15, further comprising instructions for causing the processor to:

enable a memory configuration recovery process after the memory is disabled; and override a failed status of the memory subsequent to disabling the memory.

\* \* \* \* \*